Oct. 14, 1930.　　　A. K. SJOLANDER　　　1,778,231
ADJUSTABLE BEARING
Filed Dec. 24, 1927　　2 Sheets-Sheet 1
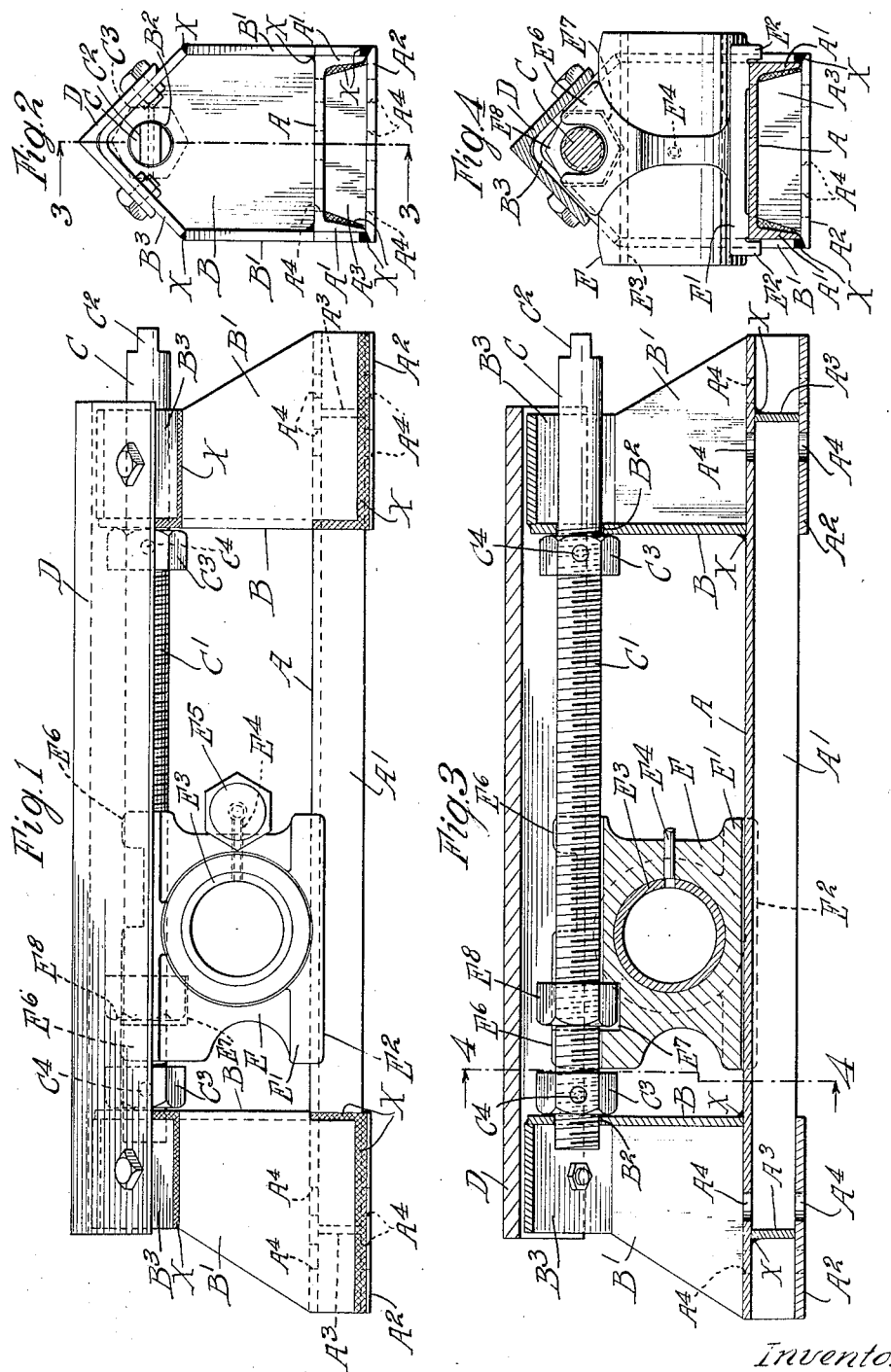
Inventor
Axel K. Sjolander
by Carker + Carter
Attorneys

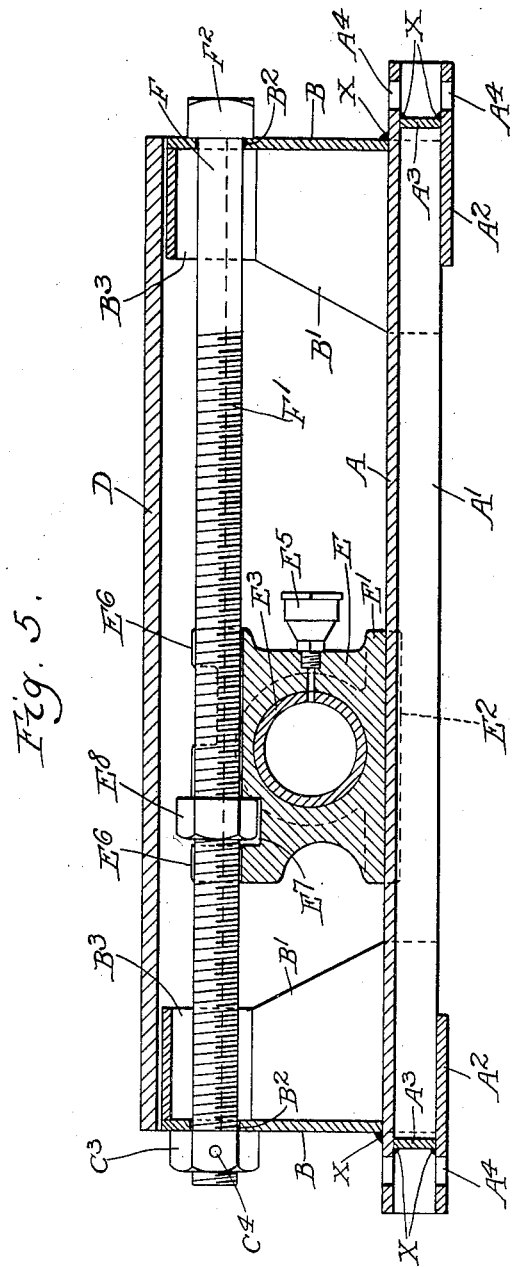

Patented Oct. 14, 1930

1,778,231

UNITED STATES PATENT OFFICE

AXEL K. SJOLANDER, OF CHICAGO, ILLINOIS, ASSIGNOR TO LINK-BELT COMPANY, OF CHICAGO, ILLINOIS, A CORPORATION OF ILLINOIS

ADJUSTABLE BEARING

Application filed December 24, 1927. Serial No. 242,456. REISSUED

This invention relates to a bearing support and particularly to a bearing adapted for adjustment. In the form shown it is particularly adapted for use as a support for bearings used in connection with conveyors and conveyor chains where it is necessary to adjust the bearing to compensate for wear and to compensate for other changes which may occur. One object of the invention is to provide a strong and rigid bearing support which is capable of minute and rapid adjustment and which is positive and self-locking. Another object is to provide a bearing support or take up of the general type shown, which is in effect formed of a single piece of material. As shown herein, it is made of several pieces welded and thus is, in effect, formed of a single member. Other objects will appear from time to time in the specification and claims.

The invention is illustrated more or less diagrammatically in the accompanying drawings wherein:

Figure 1 is a side elevation;

Figure 2 is an end view with the bearing omitted;

Figure 3 is a longitudinal vertical cross section taken generally on line 3—3 of Figure 2 with the bearing in place;

Figure 4 is a vertical cross section taken on line 4—4 of Figure 3; and

Figure 5 is a view similar to Figure 3, showing a modified form.

Like parts are illustrated by like characters throughout the specification and drawings.

A is a base portion which is formed generally, as shown, of channel sections, provided with downwardly depending side members $A^1$. Adjacent each end it may have an added strengthening member $A^2$ which extends across and joins the downwardly extending members $A^1$ at their bottoms. $A^3$, $A^3$ are additional reinforcing members extending laterally across the member A and serving to brace the parts more rigidly. $A^4$, $A^4$ are holes formed in the member A and the reinforcing member $A^2$ by means of which the parts may be screwed, bolted, or otherwise fastened to any suitable support.

Adjacent each end of the member A is an upwardly extending member B which is welded to the member A. It is provided with an angular upper edge, as shown, and has also rearwardly extending bracing members $B^1$. These members overlie the member A extending downwardly slightly beyond the member $A^1$ and are joined to the member $A^2$. Each of the members B is perforated as at $B^2$ to provide for the threaded adjusting shaft C. $B^3$, $B^3$ are angularly shaped members, one of which is welded to each of the members B and at its lower edges, to a pair of the members $B^1$, the place of welding being indicated as X.

The shaft C is threaded as at $C^1$, is square notched, or otherwise provided with an angularly shaped end portion $C^2$ and is locked in position by a pair of nuts $C^3$, $C^3$, each of which is pinned onto the shaft C by a pin or screw $C^4$. Thus the shaft C is in a position to rotate within the frame work made up of the parts A and B, but it cannot come out of the frame work.

D is an angularly shaped member which forms in effect a roof over the threaded shaft. It is preferably bolted to the members $B^3$, although it might be otherwise fastened to them.

E is a bearing housing member provided with a laterally extended bearing $E^1$ which has at its outer edges downwardly depending flanges $E^2$. $E^3$ is a bushing in the bearing E. $E^4$ is a lubricant connection. At $E^5$ is a grease or oil cup or other lubricant containing member. Adjacent the upper end the bearing housing E is providing with notched lugs $E^6$, $E^6$ which partially inclose the threaded part $C^1$ of the shaft C. $E^7$ is an angularly shaped notch formed in t upper part of the bearing housing E. Within this notch is positioned and held the nut $E^8$ which is engaged on the threads $C^1$ of the shaft C. By means of this construction when the shaft C is rotated, it will rotate with relation to the nut $E^8$, and since this nut is held against rotation, the rotation of the shaft will cause the nut to move along it and will thus cause the bearing housing to be moved backwards and forwards in response to this rotation of the shaft. In view of the shape and relative position of the threads of the shaft and the nut, the shaft cannot be rotated by pressure upon the nut from the bearing and the device therefore is self-locking and can only be moved when the shaft is positively rotated to cause movement.

There is shown in Figure 5 a modified form which is similar to the construction shown in Figure 3 except that the end pieces B and B¹ are turned about and their vertical end faces point outward rather than inward. One result of this is to lengthen the possible travel of the bearing within the take up assembly without lengthening the assembly as a whole. In the form shown in Figure 3 the effective length for bearing travel is the distance inside the faces B whereas the effective length of the device shown in Figure 5 is also the distance between the faces B but they have been reversed and thus where the member D remains the same in length, the effective length of travel of the bearing is materially increased. In the form shown in Figure 5 instead of the screw C, as used in Figure 3, a bolt F is used. It is provided with a threaded portion F¹ and a head F². The nuts upon it are the same as those used in the form shown in Figure 3.

I claim:

1. In combination in an adjustable bearing support member, a main base member comprising a supporting frame work and guiding track, such member provided with end portions, a bearing block formed to overlap said track element and adapted to be moved therealong, a moving and controlling shaft mounted for rotation in the end portions of such base member, provided with a thread, so that rotation of the shaft causes the bearing block to move along the base member, and a covering member, removably attached to the upward end portions, lying above and extending laterally and downwardly with relation to such threaded shaft, whereby the shaft is protected from the deposit of dirt and foreign matter in general.

2. In combination in an adjustable bearing support member, a main base member comprising a supporting frame work and guiding track, such member provided with end portions, a bearing block formed to overlap said track element and adapted to be moved therealong, a moving and controlling shaft mounted for rotation in the upper end portions of such base member, provided with a thread, and carrying a nut, said nut engaging said bearing block and being held against rotation therein, so that rotation of the shaft causes the bearing block to move along the base member, and a covering member removably attached to the upward end portions, lying above and extending laterally and downwardly with relation to such threaded shaft, whereby the shaft is protected from the deposit of dirt and foreign matter in general.

3. In combination in an adjustable bearing support member, a main base member comprising a supporting frame work and guiding track, such member provided with raised end portions and spaced reinforcing elements, a bearing block formed to overlap said track element and adapted to be moved therealong, a moving and controlling shaft mounted for rotation in the upper end portions of such base member, provided with a thread, and carrying a nut, said nut engaging said bearing block and being held against rotation therein, so that rotation of the shaft causes the bearing block to move along the base member, and a covering member removably attached to the upward end portions, lying above and extending laterally and downwardly with relation to such threaded shaft, whereby the shaft is protected from the deposit of dirt and foreign matter in general.

Signed at Chicago, county of Cook, and State of Illinois, this 5th day of December, 1927.

A. K. SJOLANDER.